(12) United States Patent
Kraenert et al.

(10) Patent No.: US 6,606,338 B1
(45) Date of Patent: Aug. 12, 2003

(54) MODE-SYNCHRONIZED SOLID-STATE LASER

(75) Inventors: Juergen Kraenert, Jena (DE); Thoralf Springer, Jena (DE)

(73) Assignee: LDT GmbH & Co. Laser-Display-Technologie KG, Gera (DE)

( * ) Notice: Subject to any disclaimer, the term of this patent is extended or adjusted under 35 U.S.C. 154(b) by 249 days.

(21) Appl. No.: 09/624,632

(22) Filed: Jul. 24, 2000

(30) Foreign Application Priority Data

Jul. 23, 1999 (DE) .......................... 199 34 638

(51) Int. Cl.$^7$ ................................. H01S 3/08
(52) U.S. Cl. .......................... 372/93; 372/92
(58) Field of Search ..................... 372/92, 93

(56) References Cited

U.S. PATENT DOCUMENTS

| | | | |
|---|---|---|---|
| 5,007,059 A | | 4/1991 | Keller et al. |
| 5,163,059 A | * | 11/1992 | Negus et al. .............. 372/18 |
| 5,237,584 A | * | 8/1993 | Shannon et al. ........... 372/93 |
| 5,410,559 A | * | 4/1995 | Nighan et al. ............. 372/19 |
| 5,412,683 A | * | 5/1995 | Nighan et al. ............. 372/75 |

(List continued on next page.)

FOREIGN PATENT DOCUMENTS

| | | |
|---|---|---|
| DE | 196 80 508 | 7/1997 |
| JP | 05-037048 | 2/1993 |
| WO | WO 95/21479 | 8/1995 |
| WO | WO 98 02945 | 1/1998 |

OTHER PUBLICATIONS

"Solid–State Laser Engineering" W. Koechner, Springer, 1996.

"Ultrafast All–Solid–State Laser Technology" Keller, U., Appl. Physics B, 58, 347–363 (1994).

"Resonant Passive Mode–Locked Nd:YLF Laser" Keller, U., T. Heng Chiu, IEEE J. of QE vol. 28, 1710–1720 (1992).

(List continued on next page.)

Primary Examiner—Paul Ip
Assistant Examiner—Phillip Nguyen
(74) Attorney, Agent, or Firm—Reed Smith LLP

(57) ABSTRACT

A mode-synchronized solid-state laser comprising a laser medium inside a laser resonator which is formed by a resonator mirror and an output coupling mirror and which is folded by at least one concave folding mirror, with a saturable absorber inside the laser resonator and with at least one laser pump source whose pump beam pumps the laser medium, wherein the elongated resonator length L is a function of the pulse repetition frequency and the latter is determined by a distance between the resonator mirror and the output coupling mirror. An elliptic beam profile inside of the laser resonator which is caused by an inclination of an optical axis of the at least one concave folding mirror relative to a folded optical axis of the laser resonator is eliminated by an elliptic thermal lens in the laser medium whose optical action generates an ellipticity of the beam profile which is offset by 90° relative to the elliptic beam profile generated by the folding mirror, wherein, by virtue of the material characteristics, the crystallographic orientation and the geometric dimensioning of the laser medium and by a choice of intensity and intensity distribution of the pump beam in the laser medium, the degree of ellipticity of the thermal lens is adjusted in such a way that the most uniform possible energy density distribution occurs over the irradiated zone of the saturable absorber.

22 Claims, 4 Drawing Sheets

U.S. PATENT DOCUMENTS

| | | | | |
|---|---|---|---|---|
| 5,561,547 A | | 10/1996 | Keirstead et al. | |
| 5,619,517 A | * | 4/1997 | Dixon | 372/21 |
| 5,651,020 A | * | 7/1997 | Nighan, Jr. et al. | 372/92 |
| 5,812,308 A | | 9/1998 | Kafka et al. | |
| 5,956,354 A | * | 9/1999 | Yan | 372/18 |
| 5,966,390 A | * | 10/1999 | Stingl et al. | 372/18 |
| 5,966,391 A | * | 10/1999 | Zediker et al. | 372/22 |
| 6,115,402 A | * | 9/2000 | Caprara | 372/101 |
| 6,167,068 A | * | 12/2000 | Caprara et al. | 372/22 |
| 6,275,512 B1 | * | 8/2001 | Fermann | 372/6 |
| 6,366,596 B1 | * | 4/2002 | Yin et al. | 372/92 |

OTHER PUBLICATIONS

Article: Graf, T et al. "Multi–Watt Nd: YV04 laser, mode locked by a semiconductor saturable absorber mirror and side–pumped by a diode–laser bar" Optics Communications, North–Holland Publishing Co. Amsterdam, NL, Bd. 159, Nr. 1–3, 1999, pp. 84–87, XP004152377 ISSN 0030–4018.

Article: Kurtev S Z et al.: "Effects of thermally induced birefringence in high–output power electro–optically q–switched ND: YAG lasers and their compensation" Applied Optics, Optical Society of America, Washington, US, Bd. 32, Nr. 3, Jan. 20, 1993, pp. 278–285, XP 000334484 ISSN: 0003–6935.

*English Abstract of JP 05 (1993)–037048.

"Ultrafast All–Solid–State Laser Technology"; Applied Physics B58 pp. 347–363 (1994).

"Resonant Passive Mode–Locked Nd: YLF Laser"; IEEE Journal of Quantum Electronics vol. 28 No. 7 (1992) pp. 1710–1721.

* cited by examiner $$L = l_1 + l_2$$
$$L \sim R \sim f$$

Fig. 2

MODE-SYNCHRONIZED SOLID-STATE LASER

BACKGROUND OF THE INVENTION a) Field of the Invention

The invention is directed to a mode-synchronized solid-state laser comprising a laser medium inside of a laser cavity or laser resonator which is formed by a cavity mirror or resonator mirror and an output coupling mirror and which is folded by means of at least one concave folding mirror, with a saturable absorber inside the laser resonator and with at least one laser pump source whose pump beam pumps the laser medium, wherein the elongated resonator length L is a function of the pulse repetition frequency and the latter is determined by a distance between the resonator mirror and the output coupling mirror.

b) Description of the Related Art

Mode-synchronized solid-state lasers generally require long resonators. The resonator length L determines the repetition frequency v according to the known formula:

$$v = \frac{c}{2 \cdot n \cdot L},$$

where c is the speed of light and n is the index of refraction. Typical frequencies are 50 MHZ to 300 MHZ, resulting in resonator lengths of approximately 3 m to 0.5 m, for example. In order to reduce the constructional length and to achieve sufficient stability, these resonators must usually be folded. When folding, astigmatism results with oblique incident light on spherical surfaces, so that the quality of the laser beam is appreciably worsened.

Further, the quality of the laser beam is worsened by the thermal lens, as it is called. The effect of the thermal lens and the conventional compensation in laser resonators is described in W. Koechner, "Solid-State Laser Engineering", Springer, 1996. The compensation of the thermal lens requires the use of spherical optics or a corresponding dimensioning of the active medium.

A beam with $TEM_{00}$ and $M^2 \sim 1$ is required for mode locking. Typical resonators for mode-synchronized lasers are described in Keller, U., "Ultrafast All-Solid-State Laser Technology", Appl. Physics B, 58, 347–363 (1994) or in Keller, U., T. Heng Chiu, "Resonant Passive Mode-Locked Nd:YLF Laser", IEEE J. of QE vol. 28, 1710–1720 (1992). For the resonators described therein, the passive saturable absorber is typically located in an intracavity focus with high intensity. This is achieved by means of short-focal-length focusing mirrors or by beam-bundling lenses. The active spot is kept small (Ø50–200 μm). This is required in order to achieve increasingly shorter pulse widths in the femtosecond range.

In practice, it has also been shown that the homogeneity of commercially available saturable absorbers is poor and therefore only a relatively small portion of the surface of a saturable absorber component ever fulfills its function in an optimal manner. Accordingly, a small focus (under 200 μm) is also advantageous on the saturable absorber; however, this limits the output power of the laser.

Due to the astigmatism of the folded resonator and the influence of the thermal lens in the laser medium, only a small beam cross section (e.g., 50 μm) is possible in order to achieve an approximately homogeneous beam bundle in the laser resonator. Therefore, the passive mode synchronization with a saturable absorber based on semiconductors was formerly limited to relatively small average outputs (<1 W). The laser destruction threshold of semiconductor materials of this kind is typically in the range of 1 $MW/cm^2$ to 10 $MW/cm^2$ (CW). Due to the saturable absorption and a remaining proportion of residual absorption, this value is again substantially reduced and must be taken into account in the design of the resonator. This led to various suggestions for reducing the output density and/or the output distribution in the saturable absorber.

DE 196 80 508 (Nighan) discloses diode-pumped solid-state lasers for higher average outputs in which the beam guidance in the laser resonator is adjusted in such a way that the beam bundle from the resonator mirror into the laser medium is neither confocal nor concentric (page 5, lines 20 ff: "between confocal and concentric" or "confocal-to-concentric" or "almost confocal" (page 12, line 25)). In this case, a beam deformation occurs due to the folding in the confocal resonator as well as due to the influence of the thermal lens. This arrangement is not suitable for passive mode locking since the geometry of the resonator is essentially determined by the thermal lens.

U.S. Pat. No. 5,812,308 (Kafka) discloses a mode-synchronized laser with amplifier. The distinguishing aspect of this system consists in that the laser crystal is located directly in front of the folding mirror and is pumped by the latter. The optical axis of the resonator traverses the crystal twice in the zone excited by the pump optics. The angle between the two parts of the optical axis is relatively small due to the limited dimensions of the laser medium. However, with this small angle, the astigmatism is kept comparatively slight, but severe restrictions result for the design of resonator geometry. The average output is limited by the pump geometry. A passive saturable absorber based on semiconductors with a quantum well is indicated as mode locker and simultaneously serves as a resonator mirror. It is disadvantageous that this arrangement allows only relatively small folding angles because of the laser crystal geometry.

A similar arrangement, although with a plurality of crystals, is described in U.S. Pat. No. 5,237,584 (Shannon). In this case also, the beam quality is far removed from an intracavity beam bundle with $TEM_{00}$ and $M^2 \sim 1$ because of the plurality of folds via the laser crystals and the plurality of intracavity surfaces and is therefore not suitable for mode synchronization with high output.

WO 98/02945 (Nighan) discloses a Nd-Vanadate laser with Q-switching. A single-folded resonator is used for this solution. The folding is carried out via a plane mirror and the pump light is radiated along the optical axis of the resonator. In order to minimize astigmatism, the folding mirror is flat. This arrangement is not suitable for mode synchronization because there is no possibility in this very short resonator (18 cm) for the arrangement of the mode locker or for the corresponding adjustment of the pulse energy for saturation of the passive absorber.

WO 95/21479 (Keirstaed) shows how the ellipticity of the thermal lens can be reduced principally for the $Nd:YVO_4$ crystal. This is effected by purposeful dimensioning of the heat sink and use of the anisotropy of this crystal. It is disadvantageous that the heat of the pump light which is not converted into laser radiation is preferably carried off only along two surfaces in the crystal. Accordingly, the effective cooling of the laser crystal is reduced, which leads to loss of effectiveness especially with high laser outputs. The radial symmetry of the thermal lens is suitable for linear resonators in which there is no astigmatism. However, it has been determined that the effect of the pump light distribution on the beam quality is appreciably greater than that of the heat sink.

OBJECT AND SUMMARY OF THE INVENTION

The primary object of the invention is to provide a mode-synchronized solid-state laser whose laser resonator is constructed in a particularly simple manner and which achieves the beam parameters $TEM_{00}$ and $M^2=1$ with the closest possible approximation more easily or with simpler steps and whose pulsed output radiation is as close as possible to being 100% stable. The invention has the further aim of providing a mode-synchronized solid-state laser and to provide its laser resonator in particular with a pulse repetition frequency between 50 MHZ and 300 MHZ and especially with a pulse duration between 0.1 and 100 picoseconds with higher amplitude stability, especially with an output power greater than 1 Watt and with an almost diffraction-limited laser beam.

The invention is directed to a mode-synchronized solid-state laser comprising a laser medium inside a laser resonator which is formed by a resonator mirror and an output coupling mirror and which is folded by means of at least one concave folding mirror, with a saturable absorber inside the laser resonator and with at least one laser pump source whose pump beam pumps the laser medium, wherein the elongated resonator length L is a function of the pulse repetition frequency and the latter is determined by a distance between the resonator mirror and the output coupling mirror.

The invention is characterized in that an elliptic beam profile inside of the laser resonator which is caused by an inclination of an optical axis of the at least one concave folding mirror relative to a folded optical axis of the laser resonator is eliminated by an elliptic thermal lens in the laser medium whose optical action generates an ellipticity of the beam profile which is offset by 90° relative to the elliptic beam profile generated by the folding mirror, wherein, by means of the material characteristics, the crystallographic orientation and the geometric dimensioning of the laser medium and by a choice of intensity and intensity distribution of the pump beam in the laser medium, the degree of ellipticity of the thermal lens is adjusted in such a way that the most uniform possible energy density distribution occurs over the irradiated zone of the saturable absorber.

Such compensation of the astigmatism of the folding mirror by the astigmatism of the thermal lens is achieved in a particularly simple manner when the following geometric boundary conditions are adhered to. The radius of curvature R of the folding mirror is advisably in the range of 0.5-times to 2-times the mean focal length f of the thermal lens in order to minimize its influence on the beam path in the resonator irrespective of the absolute value of the focal length f. In particular, the radius of curvature R of the folding mirror is approximately equal to the value of the average focal length f of the thermal lens.

With this dimensioning, the thermal lens has the least influence on the beam path in the resonator, since the beam-deforming action of the folding mirror and thermal lens compensate one another. Further, it is advantageous when the concave folding mirror has a radius of curvature R between L/2 and 2*L, in particular, the radius of curvature R is approximately equal to the laser resonator length L. For this purpose, this folding mirror is arranged within the elongated resonator length L and forms a first resonator branch with length $l_1$ and a second resonator branch with length $l_2$ and the laser medium is arranged therein with the thermal lens.

At a pulse repetition frequency of 160 MHZ, for example, the resonator length L is about 93 cm, the radius R of the folding mirror is about 75 cm. The average focal length f of the thermal lens should be greater than 60 cm, for example, about 80 cm.

To compensate for beam deformation (astigmatism), it is further advantageous when the lengths are adapted to one another in determined orders of magnitude: Let $l_1+l_2=L$, where $l_2$ is greater than $l_1$. In particular, $l_2$ is two-times to three-times greater than $l_1$.

An energy density must be adjusted on the surface of the saturable absorber such that the latter is brought to the saturated state once within its charge carrier lifetime, i.e., a single pulse is generated. This is achieved in that, with a given radius R of the folding mirror and a given resonator length L, the distance between the folding mirror and the resonator mirror can be adjusted with the one change in length such that the size of the irradiated zone (spot) on the saturable absorber is adjustable in such a way, depending on the radiation output impinging on the latter, that an energy density is achieved in order to saturate the saturable absorber once within its charge carrier lifetime, wherein the elongated resonator length L is retained by a further change in length between the folding mirror and the output coupling mirror.

The irradiated zone on the saturable absorber is advantageously greater than 200 μm in diameter. This ensures that the energy density is safely below a destruction threshold of the saturable absorber even at high laser output powers.

An advantageous arrangement of the invention is achieved when the folding mirror adjusts a fold angle β of the optical axis of the resonator between 5° and 45° in a fold plane. A spatially compact construction of the laser resonator is achieved in this way.

The saturable absorber is arranged at a distance $l_4$ from the resonator mirror which is less than $l_1/10$. The beam profile of the laser beam impinging on the resonator mirror is then almost identical to that impinging on the saturable absorber. Because of the separate arrangement, each structural component part can be independently produced and adjusted in the laser resonator.

It is particularly advantageous when the saturable absorber is arranged on the resonator mirror. However, this is only possible when the corresponding manufacturing techniques for a resonator mirror of this type have been successfully mastered and a component group of this kind delivers sufficiently good pulsed high-power laser radiation. This is achieved in that the saturable absorber comprises a single quantum layer (single quantum well) which is arranged on the resonator mirror.

Further, it is advantageous for the saturably absorbing action of the saturable absorber to provide at least one optical surface of the saturable absorber adjoining the free volume (air) with an anti-reflection coating.

The laser pump source is formed of one or more laser diodes which is/are optically connected with the laser medium via coupling optics. The pump optics can also be outfitted with astigmatic optics in order to influence the shape of the thermal lens in a corresponding manner.

An advantageous arrangement for instrument design consists in that a light-conducting fiber connection is provided between the laser diode(s) and the coupling optics in each instance.

The resonator mirror is a metal mirror or a dielectric mirror, in particular a Bragg reflector.

The surface normal of each end face of the laser medium advantageously extends at a small angle of between 0° and 5° relative to the optical axis of the laser resonator in order to prevent interfering reflections.

A particularly compact construction of the laser resonator is achieved in that this laser resonator is additionally folded once or twice by one or two input coupling mirrors, and the one or two laser pump source(s) pump(s) the laser medium at the ends with its (their) pump beam(s) via the input coupling mirror(s). The folding is carried out at an angle γ which, in particular, is equal to β. With one pump source at each end of the laser medium, the shape of the thermal lens can be adjusted very favorably. The pump light distribution in the laser medium is substantially homogeneous in the z-direction. The shaping of the thermal lens is not strict; its focal length can be adjusted so as to be comparatively great, which in turn enables a substantially higher laser output power.

The saturable absorber lies outside of the beam path defined by the end face of the laser medium and the input coupling mirror, i.e., the input coupling mirror is at a distance of less than $l_3/2$ from the end face of the laser medium.

Another possibility consists in that the laser medium is pumped from the side, wherein the elliptic thermal lens and the inversion distribution are adjustable by means of a distributed arrangement of the radiation of a plurality of laser pump sources along the circumferential surfaces of the laser medium.

Further, for fine adjustment of the intensity distribution on the saturable absorber, an inclination of an optical axis of the pump beam(s) is provided relative to an optical axis of the laser resonator in departure from a 0-degree position (end-pumped) or 90-degree position (side-pumped) at an angle α in a range greater than 0° to less than 5° within the y-z plane and/or the x-z plane, wherein, in particular, the ellipticity of the thermal lens can be finely adjusted with this inclination. As a consequence of this fine adjustment, it is possible to influence the spot on the saturable absorber in such a way that a faultless mode synchronization is effected. The inversion distribution in the laser crystal is adjustable by the inclination of the optical axes of the pump light, so that a matching homogeneous active spot occurs on the passive mode locker, allowing output powers of greater than 4 W.

Accordingly, larger homogeneous active beam diameters are required on the mode locker for increasing the average outputs of mode-synchronized diode-pumped solid-state lasers operating with passive mode synchronization and can be realized by the features of the invention. In order to achieve this, the laser resonator must be adapted and optimized, as was described above, in that the beam inhomogeneities resulting from the folding of the beam path, the effect of the thermal lens and the inversion distribution in the laser medium due to the pump light distribution are utilized in an advantageous manner in order to generate a pulsed laser beam with high output and constant beam parameters. However, the saturable absorber itself must likewise be sufficiently homogeneous.

A mode diaphragm which is arranged in the beam path between an end face of the laser medium and the saturable absorber generates the desired mode distribution, especially a $TEM_{00}$ mode of the laser beam.

Taking into account the above-mentioned conditions, a construction is advantageous in which only the output coupling mirror is in the first resonator branch and the laser medium with the thermal lens, the saturable absorber and the resonator mirror are arranged in the second resonator branch successively proceeding from the folding mirror. In this case, a distance $l_3$ from the laser medium to the resonator mirror is less than $l_1$ and, in particular, $l_3$ is one-half to one-third as large as $l_1$. The spot size on the saturable absorber is adjusted by the change in distance $\Delta l_2$. Also, the output coupling mirror is adjusted by $\Delta l_1$ to maintain the resonator length L. Alternatively, the folding mirror can also be displaced by $\Delta l$ and the output coupling mirror or the resonator mirror is adjusted.

In another variant, the saturable absorber and the resonator mirror are arranged in the first resonator branch successively proceeding from the folding mirror and the laser medium with the thermal lens and the output coupling mirror are arranged in the second resonator branch proceeding from the folding mirror. In this case also, the size of the spot on the saturable absorber can be adjusted by displacing the mirrors, wherein different scale ratios prevail in this case due to the changed length ratios.

It is expressly noted that the resonator geometry described above is presented by way of example. The principles of the invention are also applicable in particular with laser resonators which have a plurality of spherical folding mirrors in a laser resonator and/or which contain a plurality of laser media and/or in which the individual components have different distance ratios relative to one another.

The invention will be described in the following with reference to the FIGURES.

BRIEF DESCRIPTION OF THE DRAWINGS

In the drawings:

FIG. 2 shows a mode-synchronized solid-state laser which is end-pumped from the two sides;

DESCRIPTION OF THE PREFERRED EMBODIMENTS

Figure 1:
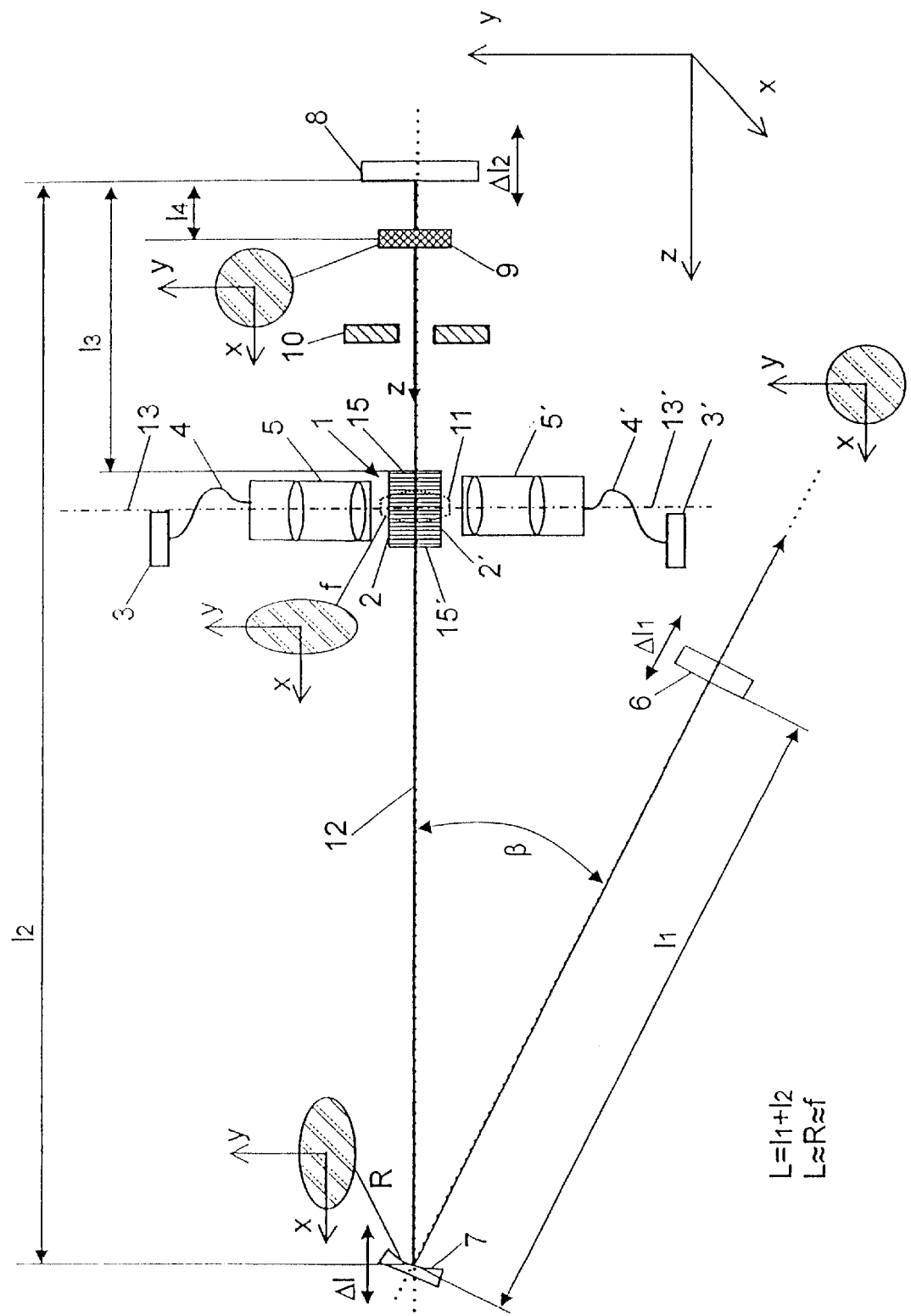
FIG. 1 shows a mode-synchronized solid-state laser which is pumped from the side faces.

FIG. 1 shows the construction of a variant of the mode-coupled solid-state laser. A laser medium 1 is pumped from two side surfaces 2 and 2' by laser diodes 3 and 3'. The laser diodes 3 and 3' are connected, respectively, with pump optics 5 and 5' via light-conducting fiber connections 4 and 4'. The pump optics 5, 5' constitute a condenser which focusses the light in a cone in the laser medium 1. The output density is adjusted in such a way that optimal conditions can be achieved for laser operation, i.e., the total optical efficiency of the laser will be greater than 30%. The laser medium 1 can be crystals of Nd:YAG, Nd:YVO$_4$, Nd:YLF or YAlO$_3$, for example. The pump wavelength of the laser diodes is adapted corresponding to the absorption of the crystal. The resonator of the laser is formed by an output coupling mirror 6, a spherical folding mirror 7 with a radius R, and a plane 99.9-% resonator mirror 8. These components give a resonator length L which results from individual distances between the components: $L=l_1+l_2$. The folding of the resonator is carried out in a y-z plane by the folding mirror 7 at an angle β. The resonator mirror 8 has a distance $l_3$ from the laser medium 1.

A saturable absorber 9 is arranged between the laser medium 1 and the resonator mirror 8 at a distance 14 from the resonator mirror 8, and a mode diaphragm 10 is advisably arranged between this saturable absorber 9 and the laser medium.

In this example, the saturable absorber 9 is a single quantum layer which is arranged on a substrate that is transparent for the laser wavelength. The interfaces of the saturable absorber 9 with the space of the laser resonator are provided with an anti-reflection coating in each instance. This coating is adapted to the medium, e.g., air or nitrogen, filling the space of the laser resonator.

The saturable absorber 9 is positioned in front of the resonator mirror 8 at a distance $l_4$ in such a way that a faultless mode synchronization is effected. This is the case, for example, when there is an intensity maximum of the laser wavelength $\lambda_L$ in the single quantum layer. The saturable absorber 9 lies closer to the resonator mirror 8 than to the laser crystal 1.

Due to the spherical folding mirror 7, an astigmatism occurs in the resonator which imparts an ellipticity to the laser beam, the magnitude of this ellipticity depends on the radius R and the folding angle β (Köcher, W., Solid-State Laser Engineering, vol. 1, edition 4, Berlin, Springer Verlag 1996). The folding angle β is 15° in this case. In FIG. 1, the shape of the beam profile generated by the folding mirror in relation to the x-y plane is shown schematically at the folding mirror 7.

In the example in FIG. 1, a pumping of the laser medium 1 is effected from the side, that is, at an angle of 90 degrees to an optical axis 12 of the laser beam. In so doing, a further astigmatism is formed in the beam path of the laser beam due to the shape of a thermal lens 11 with an average focal length f which expands over the length of the laser medium 11 in the direction of the resonator (z-direction) and vertical thereto (x-y plane). In the example according to FIG. 1, this thermal lens 11 is shown in dashed lines as an optical component and is determined with an average index of refraction f. The deformation of the beam profile of the laser beam due to the thermal lens 11 brought about by the differences in the index of refraction in the x- and y-directions is shown schematically relative to the thermal lens 11.

According to the invention, the astigmatism due to the folding mirror 7 and the astigmatism due to the thermal lens 11 are combined in such a way that a round beam profile of the laser beam occurs in the x-y plane on the saturable absorber 9. In this example, it is sufficient that the pump beam penetrates into the laser medium in the y-z plane, which, with an anisotropic material such as Nd:YVO₄, leads to the elliptic beam profile shown at this location.

An anisotropy of the material in the x-direction and y-direction can be purposefully utilized to reduce or increase the ellipticity of the thermal lens 11. In the example, the length of the resonator L is roughly equal to the radius R of the folding mirror 7 and they correspond to the average focal length f of the thermal lens 11. For example, for a pulse repetition frequency of about 214 MHz, the length L of the resonator is 770 mm, the radius of the folding mirror R is 700 mm and the average focal length of the thermal lens f is 700 mm. The lengths are selected as follows: $l_1$=250 mm, $l_2$=550 mm, $l_3$=100 mm and $l_4$=30 mm.

Another important aspect of the invention is that by a change in distance of Δl in the z-direction the size of the round beam profile on the saturable absorber 9 can be adjusted with the folding mirror 7 in such a way that a required output density for the functioning of the saturable absorber 9 for passive mode coupling is achieved on the one hand and, on the other hand, the output density is safely below the destruction threshold of the saturable absorber 9. The adjustment of the diameter of the spot on the saturable absorber 9 which is connected with the change in distance Δl is carried out by the folding mirror 7 while retaining the total length L of the laser resonator in that the output coupling mirror 6 and the resonator mirror 8 are also arranged so as to be displaceable and a corresponding length compensation can be adjusted by $\Delta l_1$ and $\Delta l_2$. The single pulse in the mode-synchronized regime of a laser resonator must possess sufficient energy to saturate the passive saturable absorber once within its lifetime.

In accordance with the desired average output for the laser, the beam diameter (active spot) on the saturable absorber 9 is adjusted to a sufficient extent that the required output density is achieved in connection with the positioning of the saturable absorber 9 in the z-direction and accordingly in relation to the intensity distribution of the standing laser wavelength. In the example, the beam diameter is 430 μm. The spot deviates from roundness by less than 2 mm on the saturable absorber.

After this adjustment of the laser resonator has been carried out, a fine adjustment of the passive mode coupling in the laser resonator is effected. This consists in varying the shape of the thermal lens as a consequence of the purposeful distribution of the radiation output of the pump light in the laser crystal. In the example according to FIG. 1, the adjustment of the energy distribution is effected by means of the distribution of the radiation of the pump light at the circumference of the side surfaces of the laser medium 1 through the adjustment of the light output of the pump light sources, in the present case, the laser diodes, and the radiating directions 13, 13' of the pump light in the laser medium 1 in departure from the 90° angle with respect to the z-axis and/or the x-axis. The saturable absorber 9 is arranged relatively close to the resonator mirror 8 so that the change in the thermal lens acts effectively on the output distribution in the spot on the saturable absorber 9. In order to obviate difficulties in maintaining an accurate adjustment, the saturable absorber 9 can also be arranged directly on the resonator mirror 8, i.e., $l_4$=0.

Further, a mode diaphragm 10 is contained in the laser resonator between the laser medium 1 and saturable absorber 9 in order to ensure a diffraction-limited beam. The resonator itself is constructed in such a way that principally only the fundamental mode begins to oscillate. A laser beam with an average diameter of 300 μm is available at the output coupling mirror 6 with a deviation from roundness of +/−8 μm.

Figure 2:
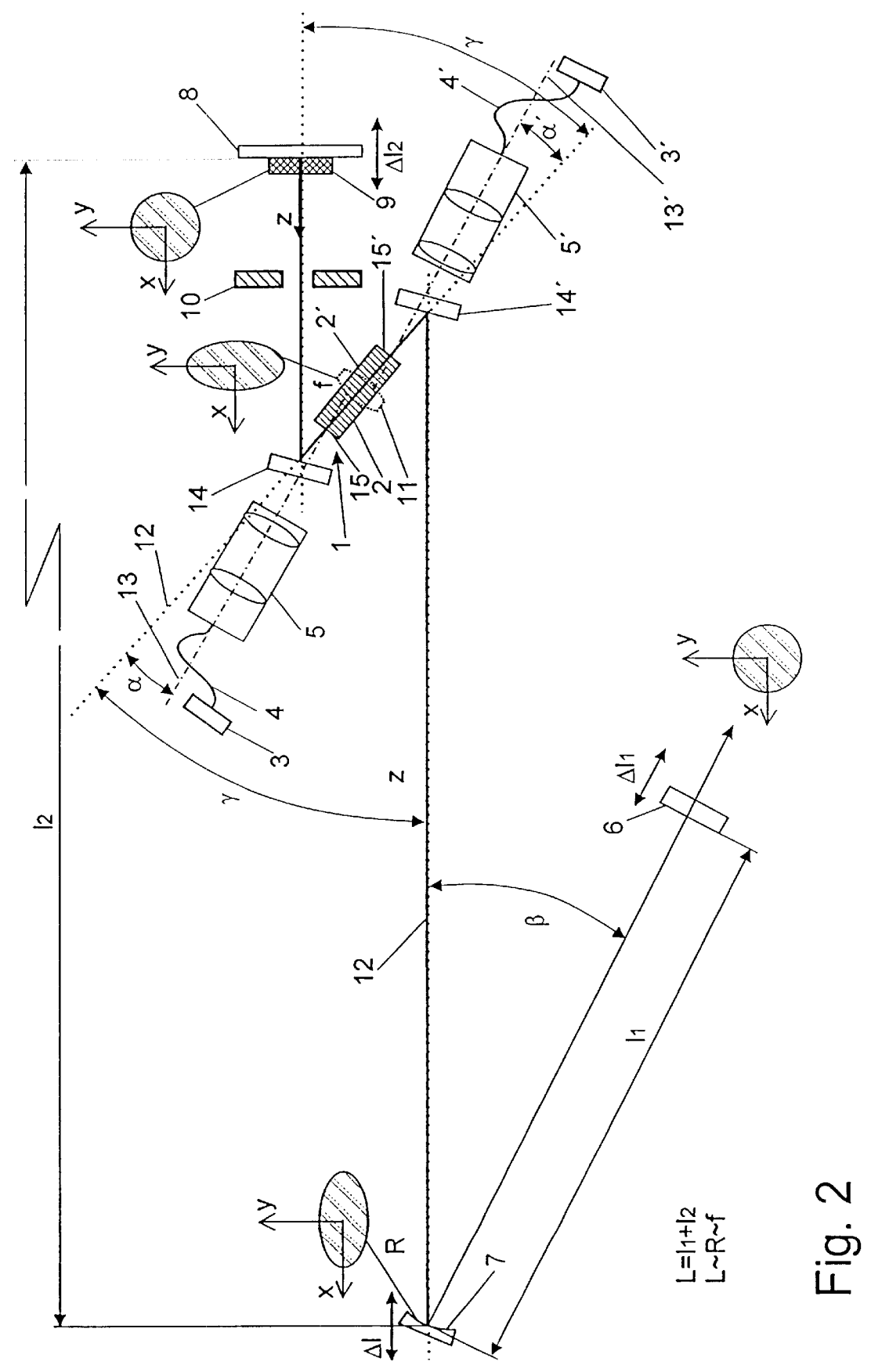

FIG. 2 shows a laser resonator whose laser material 1 is pumped on two sides from the end faces 15, 15'. The same reference numbers designate the identical structural component parts in FIG. 1. The pump light from the pump optics 5 and 5' is focused at the ends in the laser medium via input coupling mirrors 14 and 14'. The degree of bundling of the pump light and the inclination of its radiating direction by angle a relative to the optical axis 12 affects the shape of the profile of the thermal lens 11 inside the laser medium 1.

The cone of the pump beam is not radiated exactly along the optical axis of the resonator as in the prior art but, rather, at an angle α, α' to the optical axis 12. The common pump spot in the laser medium 1 then has a specifically elliptic quality. The astigmatism of the resonator due to the folding mirror 7 can then be minimized or compensated, as was described in FIG. 1, and the intensity distribution on the saturable absorber 9 can be optimized. Further, the pump optics 5, 5' can be outfitted with astigmatic optics in order to influence the shape of the thermal lens in a corresponding manner. Further, this arrangement offers the advantage that the laser medium can be cooled on all four side surfaces and an optimal heat conduction can accordingly be ensured.

Figure 3:
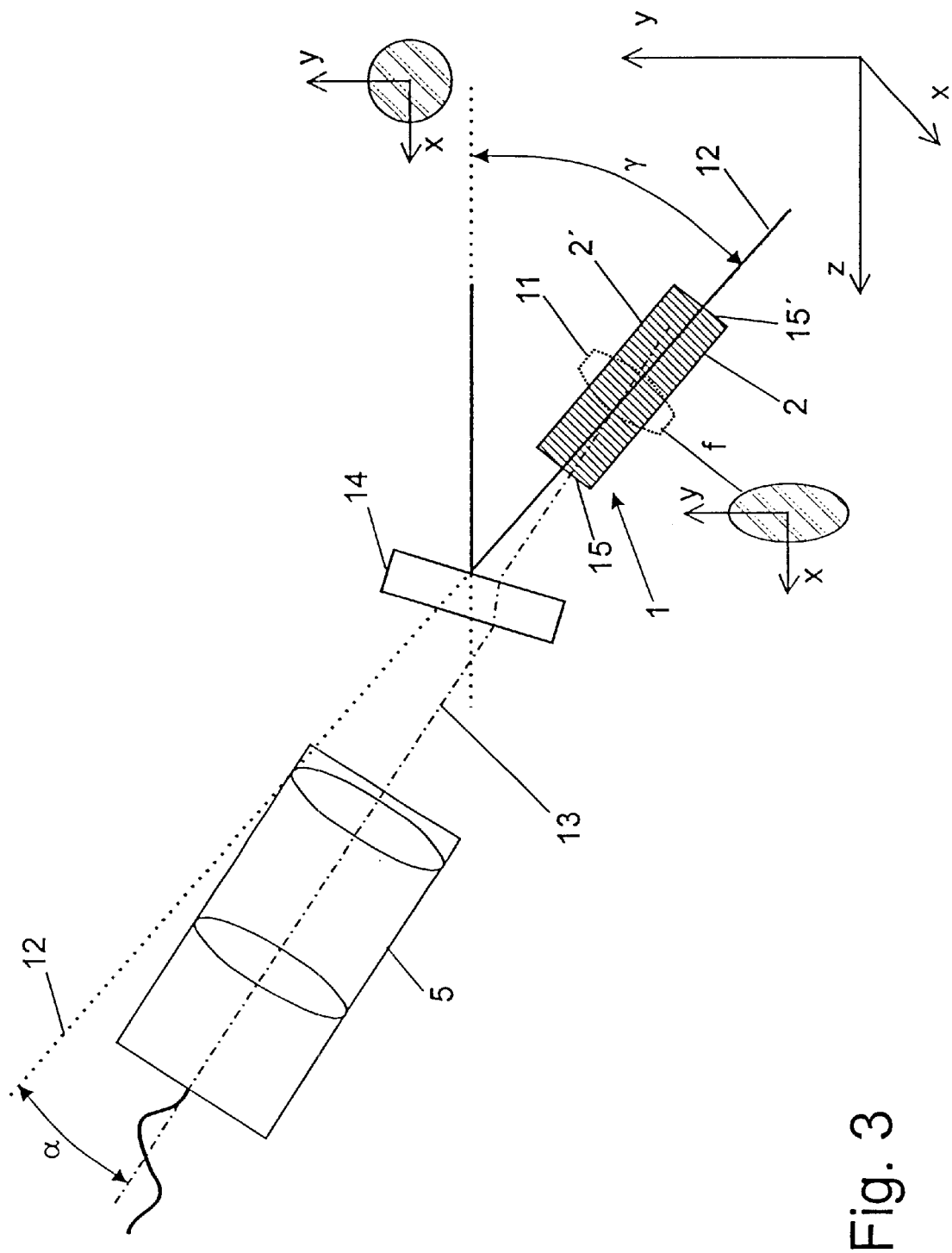
FIG. 3 shows a laser medium that is end-pumped on one side.

FIG. 3 shows an enlarged view of a laser medium 1 which is end-pumped on one side. The reference numbers in FIG. 3 refer to the same structural component parts as in FIGS. 1 and 2. The input coupling mirror 14 shown in the figure acts as a plane-parallel or parallel-sided plate for the pump beam and generates a parallel offset of the optical axis 13 of the pump beam. In FIG. 3, this optical axis 13 is shown inclined by angle a relative to the optical axis 12 of the laser beam in the y-z plane. However, this inclination can also be carried out additionally, or only, in the x-z plane.

The purpose of this inclination is to achieve a fine equilibrium of the beam characteristics of the laser beam impinging in the saturable absorber, with the result that a faultless mode synchronization is carried out which delivers single pulses with amplitude, pulse duration and repetition rates that are as constant as possible.

Figure 4:
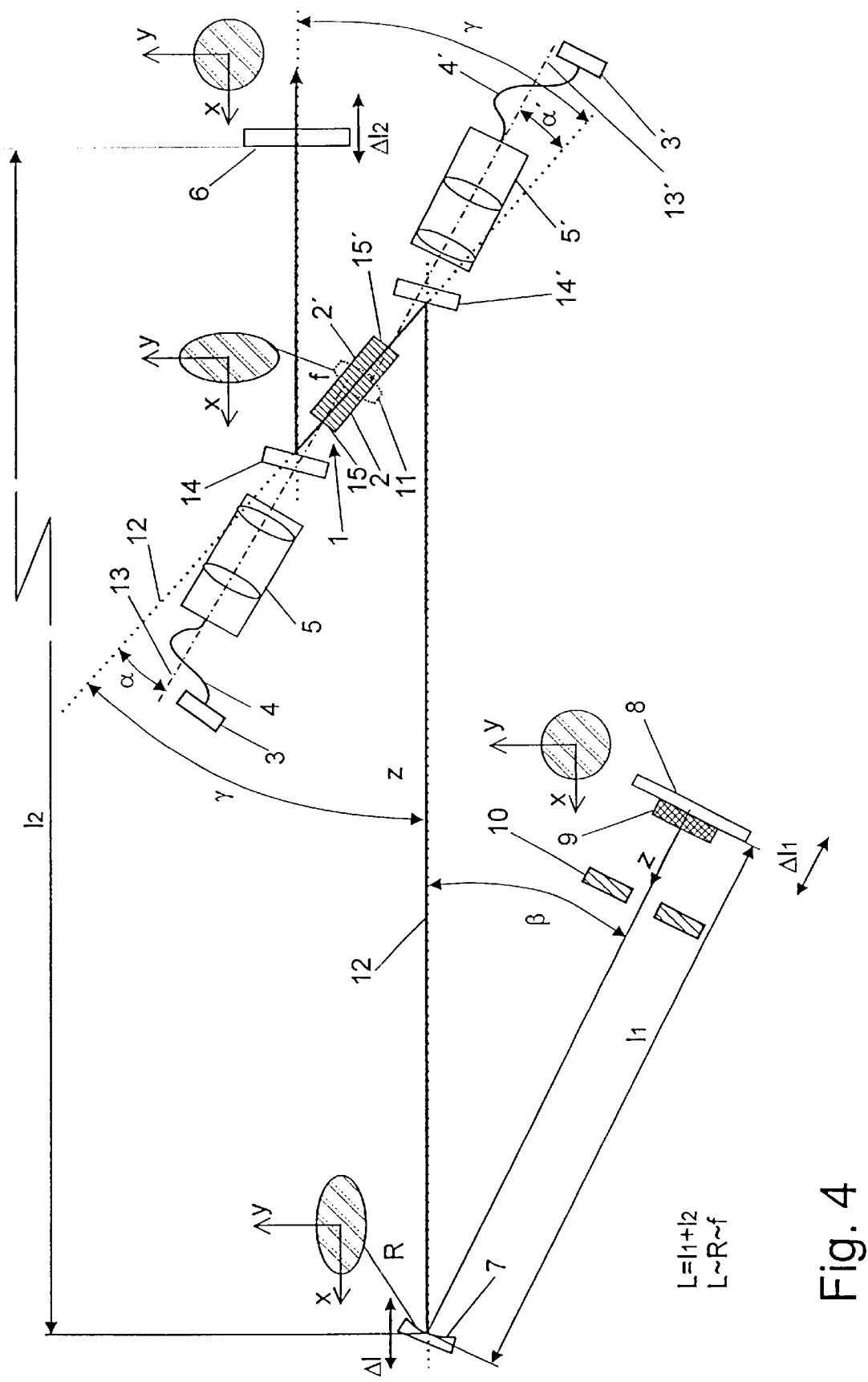
FIG. 4 shows another construction of the mode-synchronized solid-state laser which is end-pumped from the two sides.

FIG. 4 shows a resonator design whose construction is based on the construction described in FIG. 3. However, the installation position of the output coupling mirror 6 and resonator mirror 8 with the saturable absorber 9 and the mode diaphragm 10 are changed around in this case. The spot size on the saturable absorber can also be adjusted with this arrangement by means of the changes in distance $\Delta l$, $\Delta l_1$ and/or $\Delta l_2$ while retaining the resonator length L.

While the foregoing description and drawings represent the preferred embodiments of the present invention, it will be obvious to one skilled in the art that various changes and modifications may be made therein without departing from the true spirit and scope of the present invention.

What is claimed is:

1. A mode-synchronized solid-state laser comprising:
   a laser resonator;
   a laser medium being provided inside said laser resonator;
   said laser resonator being formed by a resonator mirror and an output coupling mirror and which is folded by at least one concave folding mirror;
   an optical axis of the at least one concave folding mirror being inclined relative to a folded optical axis of the laser resonator causing an elliptic beam profile inside of the laser resonator;
   a saturable absorber being provided inside said laser resonator;
   at least one laser pump source being provided whose pump beam pumps the laser medium;
   said laser resonator having an elongated resonator length L which is a function of the pulse repetition frequency;
   the pulse repetition frequency being determined by a distance between the resonator mirror and the output coupling mirror;
   an elliptic thermal lens being provided in the laser medium and eliminating said elliptic beam profile inside of the laser resonator by generating an elliptical deformation of the beam profile which is offset by 90° relative to the elliptic beam profile generated by the folding mirror; and
   wherein the elliptical deformation generated by said elliptic thermal lens is adjusted by determining the degree of ellipticity of the thermal lens by virtue of the material characteristics, the crystallographic orientation and the geometric dimensioning of the laser medium and by a choice of intensity and intensity distribution of the pump beam in the laser medium the most uniform possible energy density distribution occurs over the irradiated zone of the saturable absorber.

2. The mode-synchronized solid-state laser according to claim 1, wherein the radius of curvature R of the folding mirror is in the range of 0.5-times to 2-times the average focal length f of the thermal lens, in particular, R=f.

3. The mode-synchronized solid-state laser according to claim 1, wherein the one concave folding mirror has a radius of curvature R between L/2 and 2*L, in particular, the radius of curvature R being approximately equal to the laser resonator length L, said folding mirror being arranged within the elongated resonator length L and forming a first resonator branch with length $l_1$ and a second resonator branch with length $l_2$ and the laser medium being arranged therein with the thermal lens, wherein the distances are determined by $l_1+l_2=L$ and $l_2>l_1$, in particular $l_2$ is two to three times greater than $l_1$.

4. The mode-synchronized solid-state laser according to claim 3, wherein the distance between the folding mirror and the resonator mirror can be adjusted with the one change in length whereby the size of the irradiated zone on the saturable absorber is adjustable and depending on the radiation output incident on the latter, an energy density can be achieved in order to saturate the saturable absorber once within its charge carrier lifetime, wherein the elongated resonator length L is retained by a further change in length between the folding mirror and the output coupling mirror.

5. The mode-synchronized solid-state laser according to claim 4, wherein the irradiated zone on the saturable absorber is greater than 200 μm in diameter.

6. The mode-synchronized solid-state laser according to claim 1, wherein the folding mirror adjusts a fold angle β of a further optical axis of the resonator between 5° and 45° in a fold plane.

7. The mode-synchronized solid-state laser according to claim 1, wherein the saturable absorber is arranged at a distance $l_4$ from the resonator mirror which is less than $l_1$/10.

8. The mode-synchronized solid-state laser according to claim 7, wherein the saturable absorber is arranged on the resonator mirror.

9. The mode-synchronized solid-state laser according to claim 7, wherein the saturable absorber comprises a single quantum layer.

10. The mode-synchronized solid-state laser according to claim 7, wherein least one optical surface of the saturable absorber adjoining a free volume is provided with an anti-reflection coating.

11. The mode-synchronized solid-state laser according to claim 1, wherein the laser pump source is formed of at least one laser diode which is optically connected with the laser medium via coupling optics.

12. The mode-synchronized solid-state laser according to claim 1, wherein a light-conducting fiber connection is provided between the at least one laser diode and the coupling optics in each instance.

13. The mode-synchronized solid-state laser according to claim 1, wherein the resonator mirror is a metal mirror or a dielectric mirror, in particular a Bragg reflector.

14. The mode-synchronized solid-state laser according to claim 1, wherein the normal of each end face of the laser medium extends at an angle of between 0° and 5° relative to the optical axis of the laser resonator.

15. The mode-synchronized solid-state laser according to claim 1, wherein the laser resonator is additionally folded once or twice by one or two input coupling mirror, and the one laser pump source pumping the laser medium at the end with pump beam via the input coupling mirror.

16. The mode-synchronized solid-state laser according to claim 15, wherein a first beam path defined by the end face of the laser medium and the input coupling mirror and the saturable absorber lies outside said first beam path.

17. The mode-synchronized solid-state laser according to claim 1, wherein the laser medium is pumped from the side, wherein the elliptic thermal lens is adjustable by means of a distributed arrangement of the radiation of a plurality of laser pump sources.

18. The mode-synchronized solid-state laser according to claim 15, wherein an inclination of an optical axis of the pump beam is provided relative to an optical axis of the laser resonator at a right angle to the latter or at an angle $\alpha$ in a range greater than 0° to less than 5°.

19. The mode-synchronized solid-state laser according to claim 1, wherein a mode diaphragm is arranged in the beam path between an end face of the laser medium and the saturable absorber.

20. The mode-synchronized solid-state laser according to claim 3, wherein only the output coupling mirror is in the first resonator branch and the laser medium with the thermal lens, the saturable absorber and the resonator mirror are arranged successively in the second resonator branch proceeding from the folding mirror.

21. The mode-synchronized solid-state laser according to claim 3, wherein the saturable absorber and the resonator mirror are arranged in the first resonator branch successively proceeding from the folding mirror and the laser medium with the thermal lens and the output coupling mirror are arranged in the second resonator branch proceeding from the folding mirror.

22. The mode-synchronized solid-state laser according to claim 1 wherein the laser resonator is additionally folded twice by two input coupling mirrors, and the at least one laser pump source and a further laser pump source pumping the laser medium at the ends with pump beams of the laser pump sources via the input coupling mirrors.

* * * * *